United States Patent

[15] 3,650,100

Swan

[45] Mar. 21, 1972

[54] APPARATUS FOR FORMING ROLLS OF HAY

[72] Inventor: Sherman S. Swan, Jeffersontown, Ky.

[73] Assignees: Maurice Franklin Swan, Jr., Middletown, Ky.; James V. Naive, Oxon Hill, Md., part interest to each

[22] Filed: Dec. 16, 1970

[21] Appl. No.: 98,784

[52] U.S. Cl. ........................................................56/341
[51] Int. Cl. .......................................................A01d 39/00
[58] Field of Search...........................56/341, 342, 343, 1, 8

[56] References Cited

UNITED STATES PATENTS

| 3,057,139 | 10/1962 | Lane et al. | 56/8 |
| 3,110,145 | 11/1963 | Avery | 56/1 |
| 3,611,693 | 10/1971 | Geary | 56/341 |

*Primary Examiner*—Russell R. Kinsey
*Attorney*—Wenderoth, Lind and Ponack

[57] ABSTRACT

An apparatus for forming rolls of hay from a swath lying in a field. A wheeled frame has a forward frame portion and a main frame pivoted at the forward end thereof to the rear end of the forward frame portion. A vehicle lifting means is mounted on the forward frame portion and is coupled to the main frame for pivoting the main frame around the pivotal mounting on the forward frame portion. A downwardly open hay collecting chamber is provided on said main frame and a hay raking and lifting means is mounted on the rear of the main frame for raking the hay in the swath forwardly of the main frame and at the same time lifting it upwardly into said hay collecting chamber. Drive means on the main frame is coupled to the hay raking and lifting means for driving the hay raking and lifting means. As the apparatus is moved forwardly over a swath of cut hay, the hay is raked and lifted into the hay collecting chamber and rolled up snowball fashion, and when the desired size of roll is achieved, the apparatus is stopped and the vehicle lifting means actuated to raise the rear end of the main frame above the level of the top of the roll of hay, and the apparatus can then be moved forward over the roll of hay.

16 Claims, 8 Drawing Figures

INVENTOR
SHERMAN SWAN

3,650,100

APPARATUS FOR FORMING ROLLS OF HAY

BACKGROUND AND FIELD OF THE INVENTION

This invention relates to an apparatus for forming rolls of hay from hay which has recently been cut and is lying in a swath in a field. More particularly, it relates to an apparatus for rolling swath of partially cured hay lying in a field into a generally cylindrical roll.

Heretofore there have been two conventional methods of collecting and storing cut hay. The first has been by picking the cut hay up loose in some sort of wheeled vehicle and then stacking it in a conventional hay stack at some convenient spot or storing it in some sort of enclosure. This can be accomplished manually or with the assistance of a raking apparatus and loading device. Alternatively, the hay can be picked up and formed into bales, which are then stacked in some convenient location, for example in a barn. In modern farming operations, this can be accomplished with the aid of a raking apparatus and a pickup hay baler.

The surfaces of the conventional bales are flat, and the bales are generally rectangular. Bales cannot be stacked or ricked in the open because rain water will not run off a rick of bales, and they will become wet and rot in a relatively short time. Therefore, such conventional bales must be stored in a protected place. A collecting and baling operation therefore generally requires several men, particularly for the transfer of the bales from the baler to a transporting vehicle, and from the transporting vehicle to some kind of shelter, such as a barn.

Hay stacks, on the other hand, because the top has a generally rounded shape, shed rainwater quite readily, and therefore need not be protected from the elements. However, they are generally more difficult to form, because the hay must be moved from the ground into a pile which has the shape of the stack. While certain parts of this operation can be mechanized, it nevertheless still requires some manual labor.

SUMMARY OF THE INVENTION

Applicant has discovered that hay can rather readily be rolled into large cylindrical shaped rolls, which, while not as large as conventional hay stacks, are nevertheless several times larger than a conventional hay bale. Such cylindrical rolls, because of their shape, have been found to shed rainwater in generally the same manner as do conventionally shaped hay stacks.

It is, therefore, an object of the present invention to provide an apparatus for forming large cylindrical rolls of hay from cut hay lying in a swath in a field.

It is a further object of the invention to provide such an apparatus which can be drawn behind a conventional farm tractor.

It is still a further object of the invention to provide such an apparatus in which the moving parts are driven either by the movement of the apparatus over the ground, or from the power system of the tractor.

It is a further object of the invention to provide such an apparatus which can be operated by one man and thus makes it possible for one man to carry out a hay harvesting operation by himself.

These objects are achieved by the provision of an apparatus which has a hay raking and lifting means mounted on a wheeled frame and which rakes the hay lying on the ground forwardly and upwardly into a cylindrical roll in a downwardly open hay collecting chamber, preferably defined by curved rods or the like. Drive means are provided for driving the hay raking and lifting means from the motion of the wheeled frame over the ground. The wheeled frame has a main frame pivoted to a forward frame projecting forwardly of the main frame and having wheels thereon, and a vehicle lifting means is mounted on the forward frame portion. The lifting means is coupled to the main frame so that it can pivot the main frame around the pivotal mounting to lift the rear of the frame upwardly onto the wheels. Thus, when sufficient hay has been raked forwardly and upwardly into the roll collecting chamber, the rear end of the vehicle can be lifted clear of the roll and the apparatus pulled forward over and clear of the roll, thus leaving the roll standing on the ground.

BRIEF DESCRIPTION OF THE DRAWINGS

Other and further objects of the invention will become apparent from the following specification and claims, taken together with the accompanying drawings, in which:

DETAILED DESCRIPTION OF THE INVENTION

Figure 1:
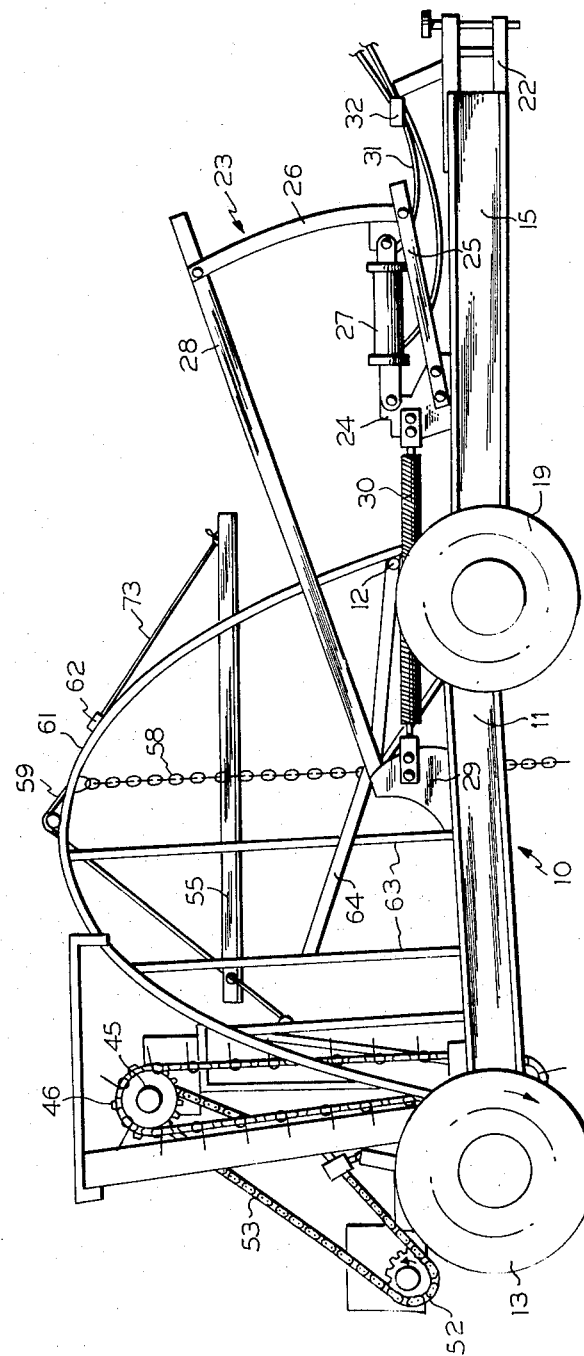
FIG. 1 is a side elevation view of an apparatus for forming a generally cylindrical roll of hay according to the invention.
Figure 2:
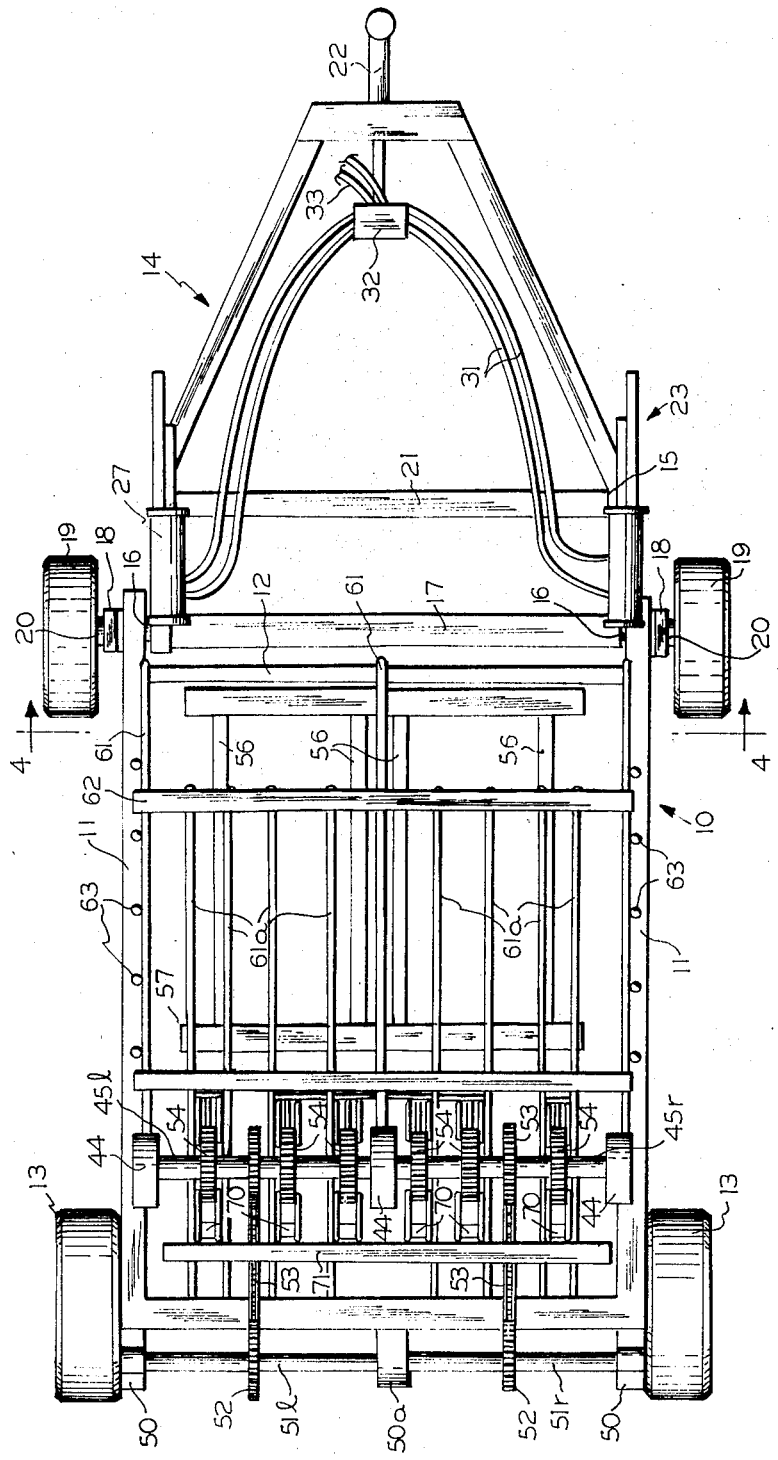
FIG. 2 is a top plan view of the apparatus of FIG. 1.
Figure 3:
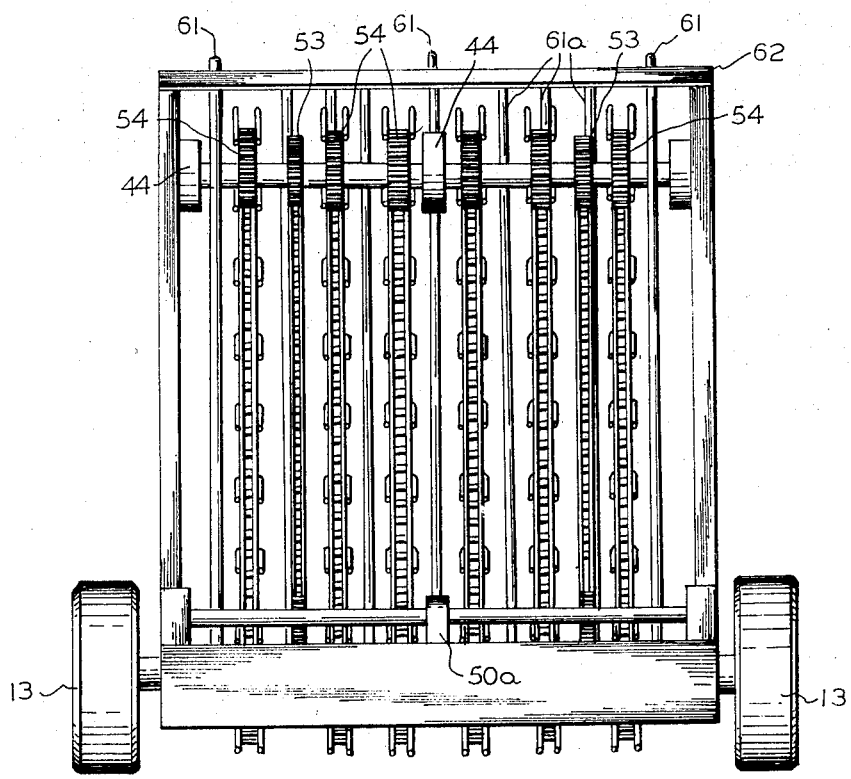
FIG. 3 is a rear elevation view of the apparatus of FIG. 1.
Figure 4:
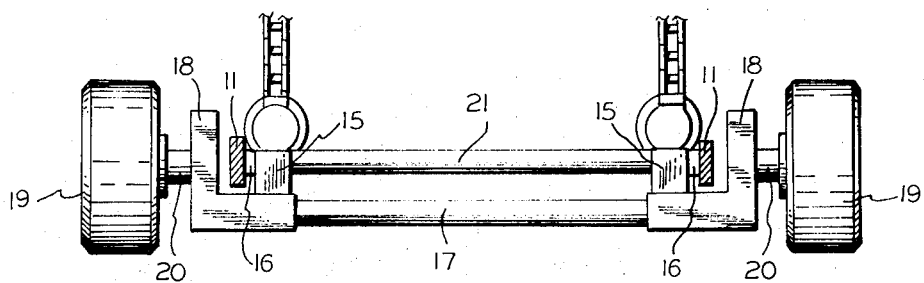
FIG. 4 is a sectional view taken on line 4—4 of FIG. 2.

Referring first to FIGS. 1-4, the apparatus has a main frame 10 which is generally rectangular and which has longitudinal side pieces 11 and transverse pieces 12. Two rear wheels 13 are mounted on the frame 10 adjacent the rear end thereof, and these wheels can be conventional rubber tired wheels or any other type of wheels which are conventional on farm vehicles. The front ends of the side pieces 11 extend forwardly past the front transverse piece 12 and pivoted to these extensions is a generally A-shaped forward frame 14 having side legs 15, the rear ends of which are pivoted on pins 16 on the extensions of the side pieces 11 of the main frame. Attached to the under sides of the legs 15 is a cross piece 17 to the ends of which are attached front wheel mounts 18. The front wheels 19 are preferably steel, for reasons which will be explained hereinafter, and are mounted on stub axels 20. A further cross piece 21 is provided where the legs 15 bend toward each other, and a tractor hitch member 22 is provided at the front end of the A-shaped frame.

Mounted on the forward frame 14 and connected to the main frame 10 is a vehicle lifting means which is here shown as a hydraulically actuated lifting linkage generally indicated at 23, there being a linkage on each side of the frame. Each linkage comprises a piston supporting bracket 24 mounted on the leg 15 of the forward frame, and a fixed arm 25 extending upwardly and forwardly of the apparatus. A link 26 is pivoted to the free end of the fixed arm 25, and a hydraulic piston 27 is pivotally connected between the link 26 and the bracket 24. A long link 28 is pivotally connected to the free upper end of the link 26 and extends rearwardly toward the main frame. On the side piece 11 of the main frame is a further bracket 29 to which the free end of the link 28 is pivoted, and tension spring means in the form of a spring 30 is connected between the bracket 29 and the bracket 24. Hydraulic lines 31 for the piston 27 extend from each piston to a manifold 32 mounted on the forward end of the forward frame 14, and hydraulic connection lines 33 extend from the manifold 32 to the hydraulic system of a tractor. The linkages 23 are preferably designed so that in their normal positions the front wheels 19 are raised slightly off the ground, so that the apparatus rolls on the rear wheels 13.

Figure 5:
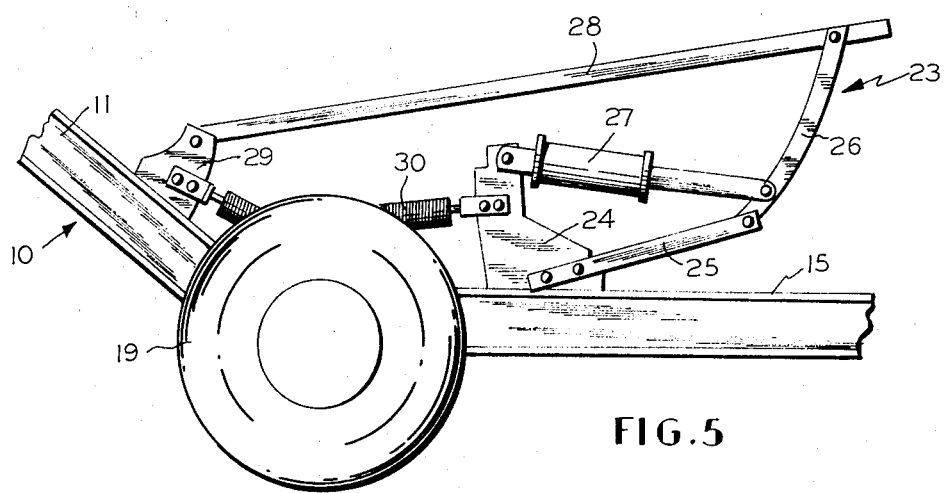
FIG. 5 is a partial side view of the apparatus of FIG. 1 with the main frame in the raised position.

The lifting linkages 23 can lift the main frame 10 from the FIG. 1 position to the FIG. 5 position. The main frame 10 is pivoted around the pivot pins 16, which pivotally connect the main frame and the forward frame. When the hydraulic piston 27 is actuated to extend the piston rod out of the cylinder, the links 26 are forced to pivot clockwise in FIG. 1, thus moving links 28 to the right. This pulls the brackets 29 to the right. Since the side pieces 11 on which the brackets 29 are mounted are pivotally held at a point between the brackets 29 and the brackets 24, the front wheels 19 are moved downwardly into contact with the ground, and then the main frame is pivoted upwardly in a clockwise direction around the pivot pins 16. The linkages 23 are designed so that the movement continues until the rear end of the main frame 10 is sufficiently far off the ground to clear a cylindrical roll of hay which has accumulated within the main frame. Upon reversal of the action of the hydraulic piston 27, the main frame is lowered until the rear wheels 13 rest on the ground, and then the front wheels 19 are raised slightly. The spring 30 is normally under tension to exert a starting force on the main frame 10 in the lifting direction. This lessens the initial load on the hydraulic pistons 27.

When the main frame is in the raised position, substantially all of the weight will be on the front wheels 19. It is therefore desirable that they be solid, and preferably they are solid steel wheels.

Mounted on the main frame is a plurality of roll container rods 61 which are curved above the main frame and define a downwardly open hay roll collecting chamber above the main frame. Three of these rods, a right and left rod and a center rod, extend from the front transverse piece 12 to the rear transverse piece 12. A cross brace 62 extends across these three rods toward the front of the main frame 10 near the top of the rods 61, and from this cross brace a plurality of further roll container rods 61a extend to the rear transverse frame 12. All of the roll container rods extend downwardly and then curve generally horizontally adjacent the rear transverse piece 12, as shown clearly in FIG. 6. A plurality of vertical side hay container rods 63 are provided at spaced intervals along the side pieces 11 of the frame 10 and are attached to the outside roll container rods 61 at the tops thereof. Angularly extending side braces 64 are attached across the vertical side hay container rods 63 on each side of the vehicle and extend to the forward transverse piece 12. Except for the hay raking and lifting means, to be described hereinafter, the bottom of the main frame 10 is open.

Mounted on each of the roll container rods 61 and 61a toward the rear of the apparatus is a vertical hay lift guide rod 35 (see FIGS. 6 and 7), the upper end of which is attached to a roll container rod, for example by welding, and the lower end of which is held spaced from the roll container rod by a brace 36 welded between the guide rod 35 and the lower rear end of the roll container rod. The lower end of each hay lift guide rod 35 is curved downwardly and rearwardly and extends below the rear end of the roll container rod to which it is attached.

Mounted on pairs of adjacent roll container rods 61 and 61a at intervals across the rear of the apparatus are idler sprocket mounting members 37 between which is mounted an idler roller 39. Extending between the corresponding pairs of roll container rods 61 and 61a near the top of the apparatus are cross braces 40. Extending downwardly from each cross brace 40 is a hay stripper comprised of a rod 41 and a stripper plate 42 attached to the lower end of the rod 41, which plate extends downwardly and curves around the idler roller 39 and then rearwardly. A supporting bracket 43 extends from the rear end of the guide plate 42 to the rear transverse piece 12 to support the lower end of the hay stripper.

Mounted adjacent the upper part of the roll container rods 61 and 61a and to the rear thereof is a plurality of drive sprocket bearing blocks 44 in which are carried right and left drive sprocket shafts 45r and 45l on which is mounted a plurality of drive sprockets 46 at positions above the idler rollers 39. The end bearing blocks 44 are shown here mounted on supports 44a, while the middle bearing block 44 is mounted on a bracket (not shown) extending rearwardly from center roll container rod 61. A hay raking and lifting chain 47 extends around each drive sprocket 46 and the corresponding roller 39, and is constructed of a plurality of links 47a adapted to engage over the teeth 46a of the drive sprocket 46 and corresponding teeth on the idler roller 39. Details of this structure are shown clearly in FIG. 8. Mounted at intervals along the chain 47 are hay raking teeth 48 which are conventional double tooth members 49 formed into a coil spring at the base thereof and mounted on blocks 50 attached to links of the chain.

Directly forward of the roll container rods 61 and 61a and resting on braces 36 is a chain lift guide 38 which extends across the machine and the ends of which are mounted on frame 11. Directly to the rear of each lifting chain 47 is a vertical lift chain guide 70 mounted at the lower end on the ends of hay strippers 41 and at the upper end on braces 71 which are connected to roll container rods 61 and 61a. The teeth 48 are guided along opposite sides of the guides 70 during the downward movement along the rear run of the chains.

Figure 7:
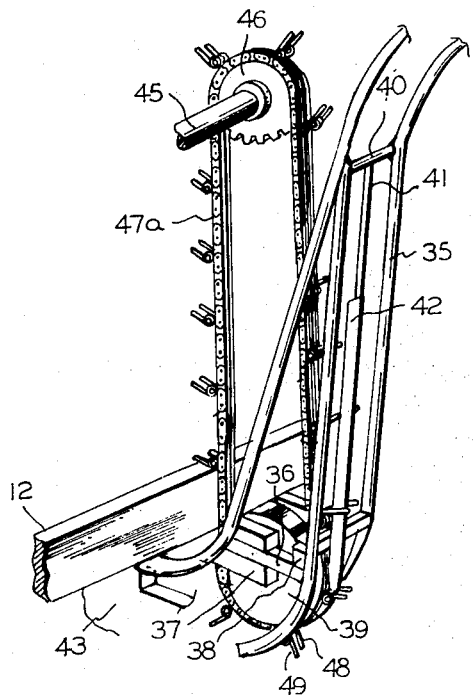
FIG. 7 is a perspective view of the hay lifting portion of the apparatus of FIG. 1.
Figure 6:
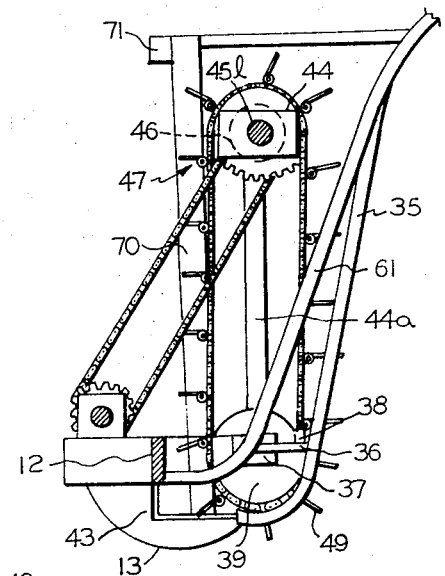
FIG. 6 is a partial sectional view through the hay lifting portion of the apparatus of FIG. 1.
Figure 8:
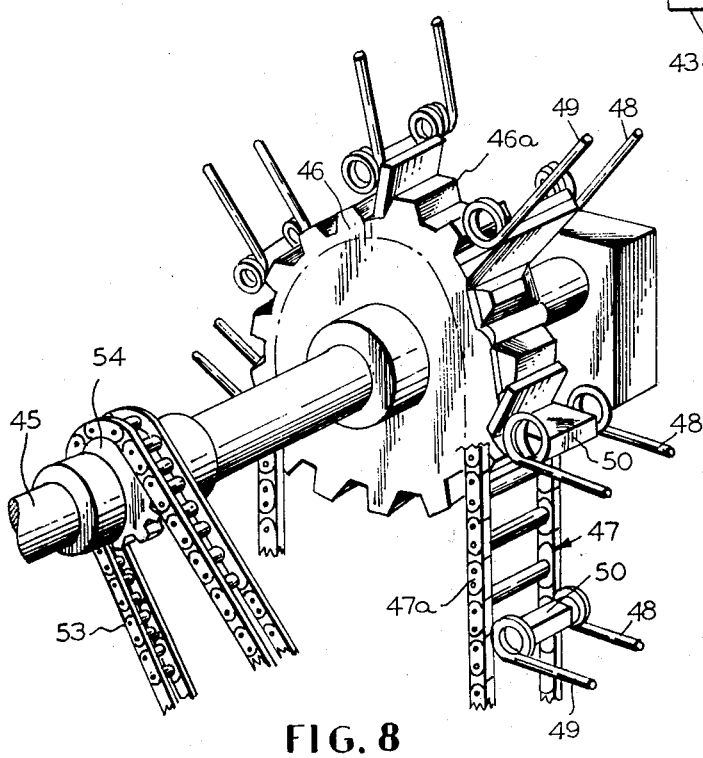
FIG. 8 is a perspective view on an enlarged scale of the upper sprocket, drive shaft, and hay rake and lift chain and drive chain.

As will be clear from FIGS. 6, 7 and 8, when the chain 47 is driven counterclockwise in these figures, the hay raking teeth 48 will be moved around the idler rollers 39, which are positioned just far enough above the ground level so that the ends of the teeth reach nearly to the ground, and then upwardly. One tooth member 49 of each pair making up individual teeth 48 passes along each side of the hay stripper 41, 42. Because of the relationship of the vertical runs of the chains 47 with the forwardly slanted plate 42, the free ends of the tooth members 49 will gradually move out of the collecting chamber as they move upwardly along the hay stripper 41,42. It will thus be seen that cut hay, which is lying on the ground beneath the apparatus, will first be raked forward by the teeth and then will be given a lifting action as the teeth 48 start to move upwardly along the front run of the chain 47. This will tend to throw the hay forward somewhat. As hay accumulates within the hay roll collecting chamber defined by the roll container rods 61 and 61a, the newly raked hay will abut against the accumulated hay and will be lifted higher than the initially raked hay. As the roll within the apparatus grows larger, the newly raked hay will be lifted higher and higher, and will also be given forward impetus by the hay lift guide rods 35 and hay stripper 41,42. The net effect of this action during the forward movement of the apparatus over the ground is to roll up a roll of hay within the hay collecting chamber somewhat in the fashion of a snowball, the teeth 48 being withdrawn from this roll as they move upwardly along the hay stripper.

The drive sprocket shafts 45r and 45l in this embodiment are driven from the rear wheels 13 of the apparatus through power take-offs from the rear wheels 13 or from the rear axle (not shown) through gear boxes 50 and right and left drive shafts 51r and 51l mounted in bearings in the gear boxes 50 and a center gear box 50a, drive gears 52 on the drive shafts 51, drive chains 53 and driven gears 54 mounted on the drive sprocket shafts 45 and 45l. The use of separate drive shafts and sprocket shafts makes it easier to turn the apparatus.

The apparatus is used in the following way. After the hay has been cut, the apparatus is hitched behind a conventional farm tractor and the hydraulic connection lines 33 are connected to the hydraulic outlets from the hydraulic system of the tractor. The apparatus is then towed along the rows or swaths of cut hay lying in the field. The hay is raked into a cylindrical roll within the hay roll collecting chamber defined by the roll containing rods 61 and 61a in the manner described above until a roll of the desired size has been obtained. The hay being formed into the roll will roll forwardly over the ground in a snowballing fashion within the roll collecting chamber so as to be moved with the apparatus. When the roll reaches the desired size, the apparatus is stopped, and then preferably backed up slightly. Then the hydraulic system of the tractor is actuated so as to actuate the hydraulic pistons 27 and thus the lifting linkages 23 so as to raise the apparatus from the position shown in FIG. 1 to that shown in FIG. 5. This will raise the rear end of the apparatus to a level higher than the top of the roll, and the tractor is again driven forwardly to tow the apparatus forwardly over the roll, the apparatus rolling on the front wheels 19. When the apparatus has cleared the roll, the hydraulic system of the tractor is again actuated to lower the rear end of the apparatus to the ground. The apparatus is then ready to start rolling up a new roll of hay.

It has been found desirable to provide a means for compacting the hay being raked into hay roll collecting chamber. One such means is a hay compressing frame 55 which is comprised of a plurality of longitudinally extending members 56 and several transverse members 57, and having the end toward the forward end of the main frame 10 suspended from a rope 73 attached to cross brace 62 and having the other end suspended on cables attached to the hay roll container rods 61 and 61a. This frame can be of a heavy material, such as heavy wood or metal, and the weight resting on the top of the hay accumulating within the hay roll collecting chamber will keep the hay compressed.

A further means of compacting the hay is a plurality of roll tightening chains 58 which are suspended from a chain support 59, and the lengths of which are adjustable. These chains are hung within the hay roll collecting chamber with the ends thereof at different distances above the ground, depending on how tightly it is desired to roll the hay into the roll. The chains act as a barrier against which the roll is formed. The closer to the ground the ends of the chains are positioned, the tighter will be the roll of hay. Six such chains at evenly spaced distances across the space within the roll container rods 61 and 61a have been found to give good control of the tightness of the stack.

Many variations of the above described structure can be made without departing from the spirit and scope of the invention. For example, other lift linkages can be devised which will accomplish the same lifting action as the specific linkage described. A direct hydraulic lift could be provided. The hay raking and lifting chains could be slanted slightly forward as long as the hay lift guide rods and plates were angled forwardly with respect to the forward run of the chain. The drive for the chains need not be from the upper end of the chains, this particular form of drive having been chosen in the described embodiment in order to keep the drive means as clear as possible of pieces of hay. Other forms of drive connection to the rear wheels can be provided, or even an independently driven means can be provided. The specific shapes of the roll containing rods and the hay guide and lift rods and plates can be changed, as long as they accomplish the function of guiding the hay during lifting and containing the roll of hay within the hay collecting chamber.

It is apparent that other changes can be made in the form, construction and arrangement of the parts without departing from the spirit and scope of the invention or sacrificing its material advantages, the forms hereinbefore described and illustrated being merely preferred embodiments thereof.

What is claimed is:

1. An apparatus for forming rolls of hay from a swath lying in a field, comprising a wheeled frame having a forward frame portion and a main frame pivoted at the forward end thereof to the rear end of said forward frame portion, a vehicle lifting means mounted on said forward frame portion and coupled to said main frame for pivoting the main frame around the pivotal mounting on said forward frame portion, means defining a downwardly open hay collecting chamber on said main frame, a hay raking and lifting means mounted on the rear of said main frame for raking the hay in the swath forwardly of the main frame and at the same time lifting it upwardly into said hay collecting chamber, and drive means on said main frame coupled to said hay raking and lifting means for driving the hay raking and lifting means, whereby as the apparatus is moved forwardly over a swath of cut hay, the cut hay is raked and lifted into the hay collecting chamber and rolled up snowball fashion, and when the desired size of roll is achieved, the apparatus is stopped and the vehicle lifting means actuated to raise the rear end of the main frame above the level of the top of the roll of hay, and the apparatus can then be moved forward over the roll of hay.

2. An apparatus as claimed in claim 1 wherein said main frame has wheels only on the rear end thereof, and said forward frame portion has wheels only on the rear end thereof and has a hitch member on the front end thereof, whereby the apparatus can be towed by a tractor of the like.

3. An apparatus as claimed in claim 1 wherein said vehicle lifting means comprises at leas one hydraulic piston mounted on said forward frame portion and a linkage extending from said hydraulic piston and said front frame portion to said main frame.

4. An apparatus as claimed in claim 1 wherein said main frame has wheels only on the rear end thereof, and said forward frame portion has wheels only on the rear end thereof and has a hitch member on the front end thereof, and said vehicle lifting means comprises at least one hydraulic piston mounted on said forward frame portion and a linkage extending from said hydraulic piston and said front frame portion to said main frame, said hydraulic piston and linkage in the normal lowered piston of the main frame with respect to the forward frame portion to pivot relative to each other to lift the wheels on the forward frame portion off the ground, whereby the apparatus can be towed by a tractor or the like while rolling only on the wheels on the rear of the main frame.

5. An apparatus as claimed in claim 1 wherein said hay collecting chamber comprises a plurality of curved roll container rods extending from the front of the main frame, curving upwardly and then downwardly, to the rear of the main frame, said rods being spaced at intervals across the width of the main frame.

6. An apparatus as claimed in claim 1 wherein said hay collecting chamber has therein a plurality of hay lift guide rods spaced across the rear of the hay collecting chamber and extending generally vertically therein from below the main frame, said guide rods being for guiding the hay being lifted by the hay raking and lifting means upwardly into the hay collecting chamber.

7. An apparatus as claimed in claim 1 wherein said hay raking and lifting means comprises a plurality of endless chains spaced across the rear of the main frame, a plurality of idler rollers mounted at spaced intervals across the rear of said main frame adjacent the bottom of said hay collecting chamber with the respective chains running around the corresponding idler rollers, a drive sprocket shaft mounted on said apparatus above said idler rollers and having a plurality of drive sprockets thereon around which the respective chains run, said drive means being coupled to said drive shaft, and a plurality of hay raking teeth at spaced intervals along said chains and projecting sufficiently from said chains to reach adjacent the ground below the bottom of said main frame and to project into said hay collecting chamber at least near the rear lower portion thereof, said drive means driving said chains in a direction to move the hay raking teeth forwardly of the main frame around the idler rollers and upwardly in said hay collecting chamber.

8. An apparatus as claimed in claim 7 in which said hay raking and lifting means further comprises a plurality of vertically extending lift chain guides mounted to the rear of the respective chains and along which said hay raking teeth run to guide said chains.

9. An apparatus as claimed in claim 1 in which said drive means is coupled to the wheels on said apparatus for driving the hay raking and lifting means from the movement of the apparatus over the ground.

10. An apparatus as claimed in claim 1 wherein said hay collecting chamber has therein means for compacting the hay being rolled into a roll in said hay collecting chamber.

11. An apparatus as claimed in claim 10 wherein said compacting means comprises a hay compressing frame having a plurality of longitudinally extending members and a plurality of transversely extending members, said hay compressing frame being suspended within said hay collecting chamber in a generally horizontal position for movement upwardly within said hay collecting chamber.

12. An apparatus as claimed in claim 10 wherein said compacting means comprises a plurality of roll tightening chains suspended vertically within said hay collecting chamber and spaced at intervals across the width of the hay collecting chamber at a position spaced forwardly of said hay raking and lifting means.

13. An apparatus as claimed in claim 1 wherein said hay collecting chamber comprises a plurality of curved roll container rods extending from the front of the main frame, curving upwardly and then downwardly, to the rear of the main frame, said rods being spaced at intervals across the width of the main frame, a plurality of hay lift guide rods within said hay collecting chamber, one mounted on each roll container rod, said hay lift guide rods extending generally vertically from below the rear end of the roll container rods and having the top ends joined to the respective roll container rods, and side hay container rods at spaced intervals along said main frame and extending between the curved roll container rods at the outside of the plurality of roll container rods to the main frame.

14. An apparatus as claimed in claim 13 wherein said hay raking and lifting means comprises a plurality of endless chains spaced across the rear of the main frame, one chain between each pair of adjacent roll container rods, a plurality of idler rollers, one mounted between each pair of adjacent roll container rods adjacent the bottoms of the roll container rods with the respective chains running around the corresponding idler rollers, a drive sprocket shaft mounted on said apparatus above said idler rollers and having a plurality of drive sprockets thereon around which the respective chains run, said drive means being coupled to said drive shaft, and a plurality of hay raking teeth at spaced intervals along said chains and projecting sufficiently from said chains to reach adjacent the ground below the bottom of said main frame and to project into said hay collecting chamber at least near the rear lower portion thereof, said drive means driving said chains in a direction to move the hay raking teeth forwardly of the main frame around the idler rollers and upwardly in said hay collecting chamber.

15. An apparatus as claimed in claim 14 wherein said roll collecting chamber further comprises a plurality of hay strippers each comprising a stripper plate extending downwardly generally parallel to the hay lift guide rods and positioned between adjacent hay lift guide rods and curved downwardly and rearwardly around and spaced from said idler rollers.

16. An apparatus for forming rolls of hay from a swath lying in a field, comprising a wheeled frame having a forward frame portion and a main frame pivoted at the forward end thereof to the rear end of said forward frame portion, a vehicle lifting means connected between said forward frame portion and said main frame for pivoting the main frame around the pivotal mounting on said forward frame portion, means defining a downwardly open hay collecting chamber on said main frame, a hay raking and lifting means mounted on the rear of said main frame for raking the hay in the swath forwardly of the main frame and at the same time lifting it upwardly into said hay collecting chamber, and drive means coupled to said hay raking and lifting means for driving the hay raking and lifting means, whereby as the apparatus is moved forwardly over a swath of cut hay, the cut hay is raked and lifted into the hay collecting chamber and rolled up snowball fashion, and when the desired size of roll is achieved, the apparatus is stopped and the vehicle lifting means actuated to raise the rear end of the main frame above the level of the top of the roll of hay, and the apparatus can then be moved forward over the roll of hay.

* * * * *